United States Patent [19]

Crosson

[11] Patent Number: 5,180,071
[45] Date of Patent: Jan. 19, 1993

[54] INSULATED NURSING BOTTLE/TOY

[76] Inventor: Penny S. Crosson, 1005 W. Avenue F, Garland, Tex. 75040

[21] Appl. No.: 645,269

[22] Filed: Jan. 18, 1991

[51] Int. Cl.$^5$ ............................ A61J 9/00; A61J 9/08
[52] U.S. Cl. ................................ 215/11.1; 215/11.6; 446/227
[58] Field of Search .................. 215/11.1, 11.6, 12.1, 215/13.1; 220/427, 429; 446/71, 74, 76, 77, 227

[56] References Cited

U.S. PATENT DOCUMENTS

| | | | |
|---|---|---|---|
| 514,575 | 2/1894 | Turner | 215/11.6 X |
| 1,221,335 | 4/1917 | Kline | 215/13.1 |
| 2,514,094 | 7/1950 | Rubin | 220/427 |
| 2,792,696 | 5/1957 | Stayart | 215/11.1 X |
| 2,808,167 | 10/1957 | Polazzolo | 215/13.1 |
| 3,661,288 | 5/1972 | Noll | 215/11.6 X |
| 4,215,785 | 8/1980 | Schwaiger | 215/12.1 X |
| 4,228,908 | 10/1980 | Tweeton | 215/11.6 |
| 4,570,454 | 2/1986 | Campbell | 215/13.1 X |
| 4,789,073 | 12/1988 | Fine | 215/13.1 |
| 4,850,496 | 7/1989 | Ruddell et al. | 215/11.1 X |

FOREIGN PATENT DOCUMENTS

| | | | |
|---|---|---|---|
| 2658111 | 7/1978 | Fed. Rep. of Germany | 220/429 |
| 607052 | 8/1948 | United Kingdom | 215/11.6 |
| 2109247 | 6/1983 | United Kingdom | 215/11.6 |

*Primary Examiner*—Sue A. Weaver
*Attorney, Agent, or Firm*—David H. Judson

[57] ABSTRACT

A combined nursing bottle and toy assembly is described comprising a nursing bottle having an outer shell, and an inner container supported in the outer shell and separated therefrom to form a space. A flowable medium is supported in the space for thermally isolating the inner container from the outer shell. Preferably, suitable decorative objects are supported within the space and the flowable medium for creating a pleasing visual effect as the nursing bottle is used.

5 Claims, 1 Drawing Sheet

INSULATED NURSING BOTTLE/TOY

TECHNICAL FIELD

The present invention relates generally to nursing apparatus for infants and more particularly to a combined insulated nursing bottle and toy assembly.

BACKGROUND OF THE INVENTION

Of the many problems faced by new parents, probably the most difficult one is feeding. This problem is especially acute if the parent and infant are frequently away from home. Typically, a baby's formula is placed in a nursing bottle at a suitable temperature and the bottle is placed in an suitable carrier. By the time the baby is ready to be nursed, however, the temperature of the formula has changed significantly depending on the weather conditions and the length of time. This makes feeding difficult and uncomfortable for both parent and child.

It is known in the prior art to provide a separate insulated baby bottle carrier to overcome this problem. One such carrier is shown in U.S. Pat. No. 4,228,908 to Tweeton. Other approaches to the problem include a "thermos" type of container, as shown in U.S. Pat. No. 2,808,167 to Polazzolo, or a glass bottle having a vacuum chamber, such as shown in U.S. Pat. No. 4,215,785 to Schwaiger. These structures, while suitable for their intended purpose, are prohibitively expensive to manufacture and often unreliable.

It would therefore be desirable to overcome these and other problems of the prior art.

BRIEF SUMMARY OF THE INVENTION

It is an object of the present invention to provide an insulated nursing bottle which maintains the contents of the bottle at desired temperatures for feeding.

It is yet another object of the present invention to provide a combined insulated bottle and toy which facilitates feeding while at the same time serves to stimulate the infant.

These and other objects of the invention are provided in a combined insulated nursing bottle/toy assembly, comprising a nursing bottle having an outer shell, and an inner container supported in the outer shell and separated therefrom to form a space. A flowable medium is supported in the space for thermally isolating the inner container from the outer shell. Preferably, suitable decorative objects are supported within the space and the flowable medium for creating a pleasing visual effect as the nursing bottle is used.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
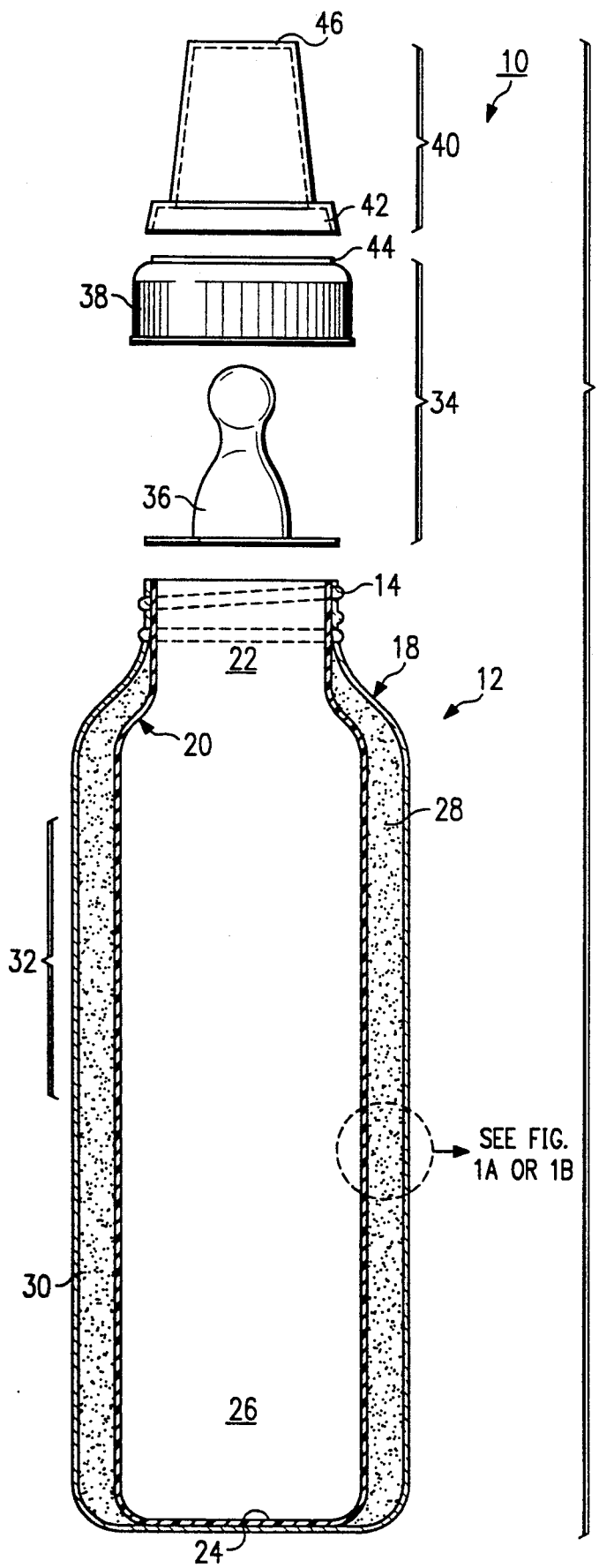
FIG. 1 is an exploded view of the combined nursing bottle/toy assembly.
Figure 1A:
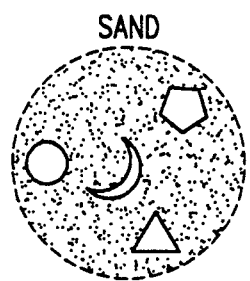
FIG. 1A is a detailed view of the flowable medium of FIG. 1 wherein the medium is sand.
Figure 1B:
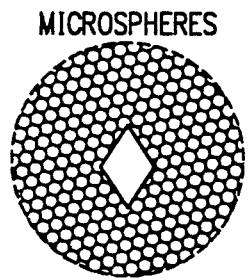
FIG. 1B is a detailed view of the flowable medium of FIG. 1 wherein the medium comprises hollow glass microspheres.

Referring now to FIG. 1, the insulated nursing bottle/toy assembly of the invention is designated generally by the reference numeral 10. The assembly 10 includes a milk bottle 12 having a threaded end portion 14. The bottle advantageously includes an outer shell 18 in which an inner tube 20 is located. The inner tube 20 is generally a cylindrical-shaped container having an open top 22 and a closed bottom 24 for defining a liquid storage area 26 within the bottle for milk or formula. The inner tube and the outer shell are separated by a space 28.

Preferably, space 28 supports a suitable low temperature coefficient medium 30 such as sand or hollow glass microspheres, which are available from various manufacturers including 3M Corporation. The medium 30 advantageously prevents or at least substantially reduces the likelihood that changes in the outside temperature affect the temperature of the milk or formula in the bottle. Such insulation insures that the milk or formula remains at substantially the same temperature which existed at the time the liquid is placed in the storage area 26. Thus the insulated bottle facilitates convenient feeding of the infant.

Moreover, it is desirable that the low temperature coefficient medium 30 be substantially transparent such that the space 28 can be filled with suitable decorative objects 32 to enable the bottle to simultaneously function as a toy. For example, and not by way of limitation, the objects are plastic, multi-colored shapes such as stars, moons, triangles, circles and the like which "float" about in the space and the medium 30 in the space and thus create a desirable aesthetic effect as the bottle is used. Alternatively, various portions of the medium itself (e.g., sand) can be dyed with different colors to create a pleasing visual effect as the bottle is moved while simultaneously insulating the bottle. Given the use of the flowable medium 30, numerous other designs are possible and envisioned by the present invention.

The combined bottle/toy 10 also includes a conventional nipple assembly 34 including nipple 36 and retainer 38, which includes interior threads designed to mate with the threaded end portion 14 of the bottle. The bottle/toy assembly 10 also includes a suitable cover cap 40 having an outer edge 42 adapted to lock onto the retainer 38 along an upper edge 44 thereof. Preferably, the cover cap 40 includes an insulating styrofoam or the like liner 46 which further insures that the milk or formula does not change temperature in use.

Although not meant to be limiting, preferably the components of the assembly 10 are formed or rigid thermoplastic material. The outer shell is preferably clear or substantially transparent to enable the design created by the flowable medium 30 to be readily visualized. Either the outer shell or the inner container generally will include suitable indicia molded thereon indicating the fluid levels as is well known in the art. If desired, the outer shell is formed with a suitable plug along the bottom thereof to enable the medium 30 to be replaced. Thus a single bottle can be used to create multiple and varied designs depending on the medium and the decorative objects supported therein. Alternatively, the inner tube of the bottle may include a thin insulating liner and the space is then filled with any flowable material suitable for supporting the decorative toy objects.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A combined nursing bottle and toy assembly, comprising:
    a nursing bottle having a cylindrical outer shell of a first diameter, and a cylindrical inner container of a second diameter less than the first diameter, the outer shell having a closed bottom and the inner container being supported in the outer shell and separated therefrom to form a space between the inner container and the outer shell;
    a flowable medium supported in the space for thermally isolating the inner container from the outer shell, wherein the flowable medium is sand; and
    decorative means comprising a plurality of decorative objects of varying colors and geometric shapes that freely float within the flowable medium for creating a pleasing visual effect as the nursing bottle is used.

2. The combined nursing bottle and toy assembly as described in claim 1 further including a nipple assembly.

3. The combined nursing bottle and toy assembly as described in claim 2 wherein the nipple assembly includes a nipple and a retainer.

4. The combined nursing bottle and toy assembly as described in claim 2 further including an insulated cover cap that is dimensioned to fit onto the nipple assembly to enclose the nipple.

5. A combined nursing bottle and toy assembly, comprising:
    a nursing bottle having a cylindrical outer shell of a first diameter, and a cylindrical inner container of a second diameter less than the first diameter, the outer shell having a closed bottom and the inner container being supported in the outer shell and separated therefrom to form a space between the inner container and the outer shell;
    a flowable medium supported in the space for thermally isolating the inner container from the outer shell, wherein the flowable medium comprises hollow glass microspheres; and
    decorative means comprising a plurality of decorative objects of varying colors and geometric shapes that freely float within the flowable medium for creating a pleasing visual effect as the nursing bottle is used.

* * * * *